Figure 1:
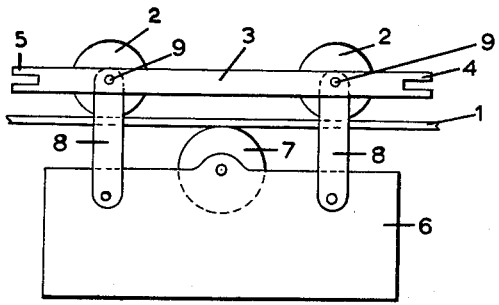

April 6, 1965   J. F. REID   3,176,628
LOCOMOTIVES FOR OVERHEAD HAULAGE SYSTEMS
Filed May 14, 1963   2 Sheets-Sheet 1

INVENTOR
JAMES FYFE REID
By Shoemaker and Mattare
ATTYS.

April 6, 1965  J. F. REID  3,176,628
LOCOMOTIVES FOR OVERHEAD HAULAGE SYSTEMS
Filed May 14, 1963  2 Sheets-Sheet 2

INVENTOR
James Fyfe Reid

United States Patent Office 3,176,628
Patented Apr. 6, 1965

3,176,628
LOCOMOTIVES FOR OVERHEAD HAULAGE
SYSTEMS
James F. Reid, Rivonia, Johannesburg, Transvaal, Republic of South Africa, assignor to Anglo-Transvaal Consolidated Investment Company Limited, Johannesburg, Transvaal, Republic of South Africa
Filed May 14, 1963, Ser. No. 280,271
Claims priority, application Republic of South Africa, Sept. 25, 1962, 62/4,047
17 Claims. (Cl. 105—73)

This invention relates to locomotives for overhead haulage systems, the locomotives either forming a part of a carriage for haulage of passengers or goods or being an independent unit adapted to be coupled to a carriage or carriages.

The object of this invention is to provide a locomotive embodying a simple mechanism whereby the adhesion between the driving wheels and the track will be automatically adjustable in use to meet operating requirements thus avoiding the necessity for a very heavy locomotive structure to obtain the necessary adhesion.

It will be appreciated that with overhead haulage systems of the type described, to prevent slippage of the driving wheels on stopping or starting to haul a load, when pulling very heavy loads, and when travelling on inclines the pressure applied by the driving wheels to the track must be greater than when pulling a light load along a level track for example. Furthermore, a structure which ensures, either due to its weight or other means, that the maximum pressure likely to be required is constantly applied to the track by the driving wheel or wheels at all times, will result in unnecessary wear and may be unnecessarily costly.

In accordance with this invention there is provided a locomotive adapted to be suspended from an overhead track comprising upper and lower wheels adapted to bear on the upper and lower surfaces of said track there being a total of at least three wheels and the lower wheel or wheels being secured to a locomotive frame, said frame being suspended from the upper wheel or wheels by a swingable link pivotally connected to the frame, a driving motor carried by the frame and connected to drive at least one wheel, and means for connecting a load to the end of the link on the side of the track vertically opposite that in contact with the motor driven wheel.

Other features of the invention will be apparent from the following description and drawings.

Figure 3:
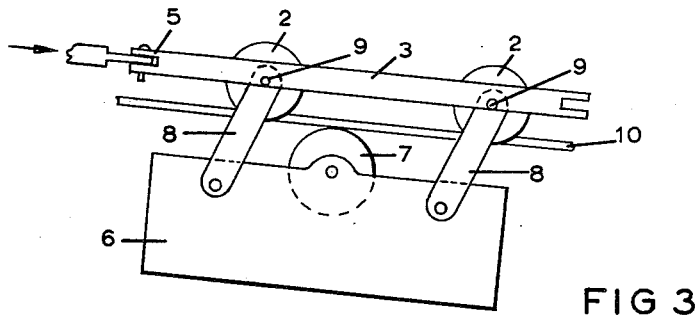
Figure 4:
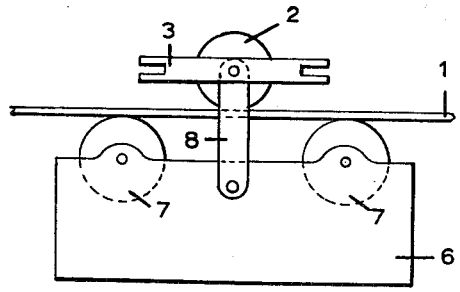
Figure 5:
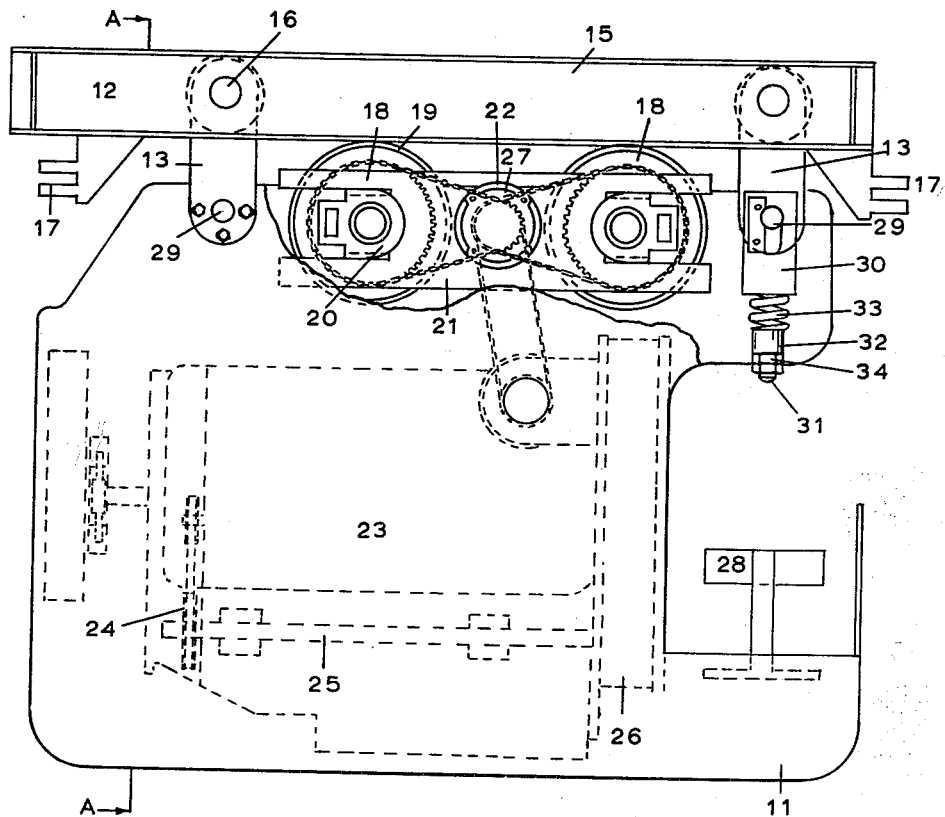
Figure 6:
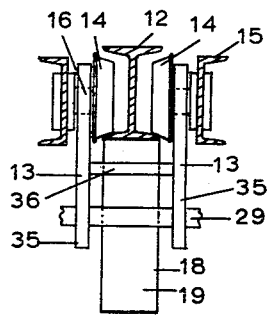

In the drawings:

FIGS. 1 to 4 are diagrammatic drawings illustrating the principle of operation of the locomotive according to this invention, FIG. 5 is a side elevation illustrating the layout of a locomotive according to this invention, parts of the one side plate of the locomotive being cut away to illustrate a method of mounting and loading the driving wheels, and FIG. 6 is a sectional elevation on the line A—A showing part of the locomotive assembly.

As shown diagrammatically in FIG. 1 there is provided an overhead track 1 supporting a pair of running wheels 2 connected together by a frame 3 each end 4, 5 of which is adapted to be connected to a load such as trucks, or other conveyances also suspended from track 1. A locomotive frame 6 carries a driving wheel 7 which bears against the lower surface of the track 1. The frame 6 is suspended from the running wheels 2 by a pair of parallel links 8 the upper ends of the links 8 being pivotally connected to the running wheel axles 9 and the lower ends of the links being pivotally connected to the locomotive frame 6. The driving wheel 7 is driven by any suitable form of motor mounted in frame 6 and is also provided with means for breaking it.

Figure 2:
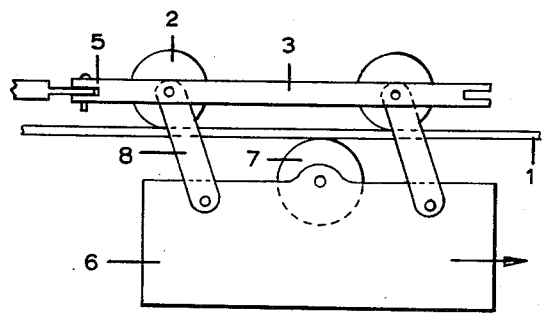

If, as shown in FIG. 2, a load is connected to the frame 3 and the locomotive frame driven by the running wheel 7 in the direction shown by the arrow then the forces applied to the upper and lower ends of the links 8 will be opposed causing them to swing in an anti-clockwise direction about the axles 9. The swinging of the links 8 will cause the driving wheel 7 to be pressed firmly against the under surface of track 1. The angle through which the links 8 swing is dependent on the tractive effort exerted by the locomotive and for practical purposes is substantially independent of the weight of the locomotive.

If, as shown in FIG. 3, the driving wheel is braked when running down an inclined portion 10 of the track, for example, the momentum of the load will cause the links to swing in a clockwise direction about axles 9 again resulting in increase in pressure applied by driving wheel 9 to the undersurface of the track 1. Thus in general any high loading due to the loading of the conveyances, travel on an incline, braking or starting will result in the links swinging in one direction or the other with consequent automatic increase in pressure applied to the track by the driving wheel thus giving the necessary increased adhesion to accommodate the increased load.

It will be appreciated that this swinging of the links is dependent basically on the tractive or braking effort being applied to one end of each link while an opposing force is simultaneously applied by the load to the opposite ends of the links 8. Thus in the embodiments shown in FIGS. 1 to 3 one or both of the upper wheels 2 could be a driving wheel and the lower wheel 7 could be a running wheel provided the load was connected to the bottom of the links 8 via the frame 6 or in some other manner.

It will also be appreciated that any number of driving and running wheels may be used and positioned on either side of track 1 provided they can hold the locomotive in correct relation to the track. The minimum stable arrangement of wheels is three with at least one on the upper and at least one on the lower surface of the track. Thus, as shown in FIG. 4, for example, a stable arrangement may be achieved with two driving wheels 7 bearing on the undersurface of the track and with the locomotive suspended from a single running wheel 2. Again the roles of the running and driving wheels may be reversed.

In practice the driving wheels should generally be provided with a frictional surface such as is obtained by the use of a rubber tyre, and means should be provided to adjust the minimum loading of the driving wheels and to cushion shock loading due to swinging of the links. Also unless some special form of track is used the running wheels should be mounted in co-axial pairs so that they cannot come off the track, and the links should also each consist of a pair of parallel arms corresponding to the pairs of running wheels to achieve a suitably balanced suspension. This is illustrated in FIGS. 4 and 5 in which the arrangement of a practical form of locomotive is shown somewhat diagrammatically.

Thus, as shown, the locomotive frame 11 is suspended from a track 12 in the form of an I beam by pairs of links 13 pivotally connected to corresponding sides of the frame 11 and to the axles of two pairs of running wheels 14. The latter are mounted on a frame 15 of channel section carrying inwardly projecting stub axles 16. Shackles 17 or the like are provided at each end of frame 15 for connection of a load thereto.

Two driving wheels 18 are used each fitted with a rubber tyre 19 and mounted on slides 20. The driving wheel assembly is supported by a bogie or truck 21 rotatable on an axle 22 to allow for adjustment of position of the driving wheels 18 when traversing a portion of track which changes its angular inclination in a vertical plane. This arrangement is not necessary when a single driving wheel is used.

Any suitable form of drive mechanism may be used to drive the wheels 18 such as the assembly illustrated, mainly in dotted lines, and consisting of diesel engine 23, belt drive 24, great shaft 25, gearbox 26, chain drive to sprocket 27, co-axial with axles 22 and connected by driving chains to the driving wheels 18. A driving seat 28 is provided and also the necessary controls (not shown).

The pin 29 of the one link 13 is located in a fixed position in a slotted block 30 slidable vertically in relation to the locomotive frame 11 and mounted on the upper end of a robust stud 31 fitting through a collar 32 secured to the locomotive frame.

A compression spring 33 is fitted on the stud 31 between the block 30 and collar 32 and nuts 34 are threaded on the lower end of the stud projecting below the collar 32. The minimum loading on the driving wheels that is, when the links 13 are vertical, is adjusted by means of the nuts 34 which will cause a raising or lowering of the frame 11 in relation to the one link pin 29. This in turn will cause an increase or decrease in the upward pressure applied by the driving wheels 13 to the undersurfaces of the track 12. Shock loading due to swinging of the links 13 is cushioned by the springs 33.

As stated the links 13 each comprise a pair of arms 35 and one member of each pair of arms 35 is located on each side of the track with the arms joined by a cross-member 36 as will be more clearly seen from FIG. 4 which illustrates the relationship of the running and driving wheels, the running wheel frame and bearings, the link arms 35 and pins 29.

While it is convenient to utilize the wheel axles 16 as pivots for the upper ends of the link arms 35 they could, if desired, be pivotally connected to the frame 15.

What I claim as new and desire to secure by Letters Patent is:

1. A locomotive for suspension from an overhead track comprising an upper and lower wheel assembly adapted for constant tractive engagement with upper and lower traction surfaces of a supporting overhead track, there being a total of at least three wheels in said assemblies, a locomotive frame carrying the lower wheel assembly, link means coupling said frame with the upper wheel assembly, said link means having an upper end pivotally connected to the upper wheel assembly and a lower end pivotally connected to the locomotive frame, a driving motor carried by the locomotive frame, a driving connection between said motor and a wheel of one wheel assembly and means for connecting a load to the other wheel assembly.

2. A locomotive adapted to be suspended from an overhead track comprising an upper and lower wheel assembly adapted for constant tractive engagement with upper and lower traction surfaces of a supporting overhead track, there being at least two longitudinally spaced wheels in the upper wheel assembly and one wheel in the lower wheel assembly, said one wheel being positioned below and between the wheels in the upper wheel assembly, a locomotive frame carrying the lower wheel assembly, link means for suspending said frame from the upper wheel assembly, said link means having an upper end pivotally connected to the upper wheel assembly and having a lower end pivotally connected to the locomotive frame, a driving motor carried by the locomotive frame, a driving connection between said motor and a wheel of one wheel assembly, and means for connecting a load to the other wheel assembly.

3. A locomotive for suspension from an overhead track comprising an upper and lower wheel assembly adapted for constant traction engagement with upper and lower traction surfaces of a supporting overhead track, at least two longitudinally spaced wheels in the upper wheel assembly, a pair of wheels in the lower wheel assembly, a locomotive frame, a truck carried by said frame and supported thereon for rotation about a horizontal axis, said truck carrying said wheels in the lower wheel assembly and locating them below and between the wheels in the upper wheel assembly, link means for suspending said frame from the upper wheel assembly, said link means having an upper end pivotally connected to the upper wheel assembly and a lower end pivotally connected to the locomotive frame, a driving motor carried by the locomotive frame, a driving connection between said motor and a wheel of one wheel assembly and means for connecting a load to the other wheel assembly.

4. A locomotive as claimed in claim 1 including means for vertically adjusting the position of the locomotive frame in relation to the upper wheel assembly.

5. A locomotive as claimed in claim 2 including means for vertically adjusting the position of the locomotive frame in relation to the upper wheel assembly.

6. A locomotive as claimed in claim 3 including means for vertically adjusting the position of the locomotive frame in relation to the upper wheel assembly.

7. A locomotive for suspending from an overhead track comprising a wheel frame, two longitudinally spaced running wheels mounted in said frame, a locomotive frame, a pair of longitudinally spaced links for suspending the locomotive frame from the wheel frame, each link having an upper end pivotally connected to the wheel frame and a lower end pivotally connected to the locomotive frame, a driving wheel mounted on said locomotive frame and positioned below and between the running wheels, a frictional surface on said driving wheel, a motor carried in the locomotive frame, a driving coupling between said motor and said driving wheel, and means for connecting a load to the running wheel frame.

8. A locomotive for suspension from an overhead track comprising a wheel frame, two longitudinally spaced running wheels mounted in said frame, a locomotive frame, a pair of longitudinally spaced links for suspending the locomotive frame from the wheel frame, each link having an upper end pivotally connected to the wheel frame, a lower end of one link being pivotally connected to the locomotive frame and a lower end of the other link being pivotally, adjustably and resiliently connected to the locomotive frame, a driving wheel mounted on said locomotive frame and positioned below and between the running wheels, a frictional surface on said driving wheel, a motor carried in the locomotive frame, a driving coupling between said motor and said driving wheel and means for connecting a load to the wheel frame.

9. A locomotive for suspension from an overhead track comprising a wheel frame, two longitudinally spaced running wheels mounted in said frame, a locomotive frame, a pair of longitudinally spaced links for suspending the locomotive frame from the wheel frame, each link having an upper end pivotally connected to the wheel frame and a lower end pivotally connected to the locomotive frame, a truck mounted on said locomotive frame and rotatable about a horizontal axis, a pair of interconnected driving wheels mounted on said truck and both positioned below and between the said running wheels, a motor carried on the locomotive frame, a driving connection between said motor and said driving wheels and means for connecting a load to the wheel frame.

10. A locomotive for suspension from an overhead track comprising a wheel frame, two longitudinally spaced running wheels mounted in said frame, a locomotive frame, a pair of longitudinally spaced links for suspending the locomotive frame from the wheel frame, each link having an upper end pivotally connected to the wheel frame, the lower end of the one link being pivotally connected to the locomotive frame and the lower end of the other link being pivotally, adjustably and resiliently connected to the locomotive frame, a truck mounted on said locomotive frame and rotatable about a horizontal axis extending transversely of the latter frame, a pair of interconnected driving wheels mounted on said truck and both positioned below and between the said running wheels, a motor carried on the locomotive frame, a driving connection between said motor and said driving wheels, and means for connecting a load to the wheel frame.

11. A locomotive in accordance with claim 7 including two pairs of longitudinally spaced stub axles projecting inwardly from the wheel frame, a running wheel mounted on each stub axle, and parallel link arms rotatably suspended from each stub axle.

12. An overhead haulage system comprising an overhead track having an upper traction surface and a lower traction surface, an upper wheel assembly in constant wheel engagement with said upper traction surface, a lower wheel assembly in constant wheel engagement with said lower traction surface, a locomotive frame carrying said lower wheel assembly, suspension link means pivotally connecting said upper wheel assembly with said frame for operative swinging movement of the frame in either direction longitudinally of the overhead track, a driving motor carried by said locomotive frame, a driving connection between said motor and a wheel of one assembly, and means for connecting a load to the other assembly, said locomotive supporting frame and wheel assembly on the opposite side of the track therefrom being moved in opposite directions relative to one another upon driving rotation of the wheel of said one assembly whereby adhesion of said one wheel with its traction surface will be altered in accordance with requirements of a load, for maintaining a non-slipping engagement with its traction surface.

13. The invention according to claim 12, wherein said upper wheel assembly includes a pair of spaced elongate frame members in spaced parallel relation with said track positioned longitudinally therebetween, a pair of stub axles carried by each of said elongate frame members, and wherein each stub axle carries a wheel of the said upper wheel assembly.

14. The invention according to claim 12, wherein said upper wheel assembly includes a pair of spaced elongate frame members in spaced parallel relation with said track positioned longitudinally therebetween, a pair of stub axles carried by each of said elongate frame members, and wherein each stub axle carries a wheel of the said upper wheel assembly, and said suspension link means connecting the upper wheel assembly with the locomotive frame consisting of link elements each supported by and hanging from a stub axle.

15. An overhead haulage system, comprising an overhead track having upper traction surfaces and a lower traction surface, an upper wheel assembly comprising at least a pair of tandem running wheels on the upper traction surface and on each side of said track, rigid connecting means between the tandem wheels on their respective sides of said track, stub axles on said connecting means and each axle carrying a running wheel, said running wheels being arranged in forward and rearward pairs spaced apart transversely of the track, a locomotive frame positioned below said track, a suspension link having an upper end pivotally attached to and suspended from each stub axle and having a lower end pivotally connected to said frame whereby said frame has swinging movement longitudinally of the track and in the vertical plane of the track, a driving wheel supporting truck body disposed beneath said track and adjacent to an upper portion of said frame, means supporting the truck body on the frame at a location between the forward and rearward pairs of running wheels, a driving wheel rotatably mounted on the said supporting truck body and having constant driving engagement with the said lower traction surface of the track at a location between the forward and rearward pairs of running wheels, a driving motor carried by said locomotive frame, a driving coupling between the driving motor and the driving wheel, said driving wheel being selectively adapted to impart forward and rearward driving thrust against said lower traction surface, and means for connecting a load to the upper wheel assembly, the said suspended locomotive frame and parts supported thereby from the running wheels by said links tending to swing upon the application of driving thrust by the driving wheel against the said lower traction surface and thereby effect adhesive engagement of the driving wheel with its traction surface in accordance with requirements of a load for maintaining a non-slipping engagement between the driving wheel and its traction surface.

16. The invention according to claim 15, with a second driving wheel rotatably supported on said supporting truck body in tandem with the first stated driving wheel and having constant driving engagement with said lower traction surface, the said means supporting the truck body on said frame forming a pivotal connection between the truck body and frame with its turning axis extending transversely of the frame, and the said driving coupling between the driving motor and the first said driving wheel including a sprocket and chain drive with a sprocket wheel supported to rotate coaxially with said pivotal connection and having driving chain and sprocket wheel connection with the second mentioned driving wheel.

17. The invention according to claim 15, wherein at least two of said suspension links include a shock absorbing compression spring between the supporting stub axles therefor and the motor supporting frame, at one end of the latter.

References Cited by the Examiner

UNITED STATES PATENTS

| | | | |
|---|---|---|---|
| 1,411,845 | 4/22 | Dodge | 105—150 |
| 1,748,798 | 2/30 | Ryan | 105—150 X |
| 2,608,163 | 8/52 | Martin | 105—153 |
| 2,884,871 | 5/59 | Mazzola et al. | 105—148 |
| 3,101,678 | 8/63 | Grube | 105—153 X |

MILTON BUCHLER, *Primary Examiner.*

LEO QUACKENBUSH, *Examiner.*